United States Patent [19]

May et al.

[11] Patent Number: 4,996,533
[45] Date of Patent: Feb. 26, 1991

[54] SINGLE STATION RADAR OCEAN SURFACE CURRENT MAPPER

[75] Inventors: Peter T. May, Longmont; Richard G. Strauch; Bob L. Weber, both of Boulder, all of Colo.

[73] Assignees: Univ. of Colo. Foundation, Inc., Boulder, Colo.; The United States of America as represented by the Secretary of the Commerce, Washington, D.C.

[21] Appl. No.: 408,007

[22] Filed: Sep. 15, 1989

[51] Int. Cl.$^5$ .................. G01S 13/58; G01S 13/00; B21B 21/00
[52] U.S. Cl. .................................... 342/108; 73/189; 342/195; 342/26
[58] Field of Search .............. 342/26, 107, 108, 195, 342/461; 73/189; 367/88, 89, 90

[56] References Cited

U.S. PATENT DOCUMENTS 4,558,594 12/1985 Balser et al. .................. 73/189

Primary Examiner—Gregory C. Issing
Attorney, Agent, or Firm—Thomas Zack; Alvin J. Englert; Frank A. Lukasik

[57] ABSTRACT

A method and system for mapping ocean currents with a single radar. The radar is a pulsed monostatic radar operating in the HF/VHF range using a single transmitting antenna with a wide beam width. There is a linear array of antennas, each with its own receiver/digitizer system to sample the complex signal. The summing and phasing of the signals is done in software. The correlation functions are calculated using two successive complex Fourier transforms. The current vectors are measured as a function of range and angle from the radar site, thereby generating the current map.

3 Claims, 3 Drawing Sheets (1) SPECTRUM (F(f)) IS FOURIER TRANSFORM OF TIME SERIES. POWER SPECTRUM (S(f)) IS THE SPECTRUM WHERE THE SPECTRAL COEFFICIENTS ARE SQUARED. $S(f) = F^*(f)F(f)$
\* COMPLEX CONJUGATE.

SINGLE STATION RADAR OCEAN SURFACE CURRENT MAPPER

ORIGIN OF THE INVENTION

The invention described herein may be manufactured and used by or for the Government for governmental purposes without the payment of any royalties thereon or therefore.

BACKGROUND OF THE INVENTION

1. Field of the Invention

The present invention relates to oceanographic measuring systems, and more particularly to surface current mapping systems.

2. Description of the Prior Art

A radar using vertically polarized radiation can observe backscatter from the sea surface to infer surface currents for such applications as coastal research and pollution monitoring. One such prior art system is shown in U.S. Pat. No. 4,172,255 to Barrick et al. Backscatter from advancing and receding waves with a wavelength half that of the radar wavelength gives signals allowing the measurement of ocean currents along the line of sight. One limitation of these Doppler radar systems to date has been the inability of directly measuring the transverse component of the current without a second radar located a considerable distance from the first, so that a given patch of ocean is observed from two radars with nearly orthogonal viewing directions. This introduces some limitations on the siting of these radars and a degree of complication because the maintenance of two radar sites and the need to transmit data from one radar to the other to generate real-time current maps.

Another factor is that with two radars, there is sometimes an incomplete spatial overlap between the two radar volumes needed to measure the full current vector, which may lead to errors in complex flows. However, here it will be shown that the transverse component of the current can be measured using correlation analysis of the received signal from spatially separated receiving antennas with a single radar. This technique has been used for atmospheric radars and for optical remote sensing applications.

There are numerous applications fgr monitoring surface currents near shore (out to 30 km). The recent oil spill at Prince William Sound (Exxon-Valdez) provides a dramatic example of a case where an accurate current map could have significantly improved the damage control. Other applications include mapping the current field around ports or fish spawning grounds and as an oceanographic research tool.

SUMMARY OF THE INVENTION

Accordingly, an object of this invention is to provide an improved system for measuring and mapping surface currents.

It is another object of this invention to provide a system which is capable of measuring the full current vector.

It is a further object of the present invention to provide such a system which can produce a surface current vector map in real-time at the radar location or at a remote station.

It is yet a further object of this invention to provide a radar that scans the ocean surface with a directional beam and maps the full ocean current vector from a single radar station using two spatially separated antenna arrays and correlation methods to determine the transverse current component.

In accordance with the present invention, a single radar scans the ocean surface with a directional beam and uses spatially separated antenna arrays and correlation methods to determine the transverse component. The line-of-sight component is simultaneously measured. The radar may be a pulsed monostatic radar operating in the HF/VHF range. It has a single transmitting antenna (e.g. Yagi) with a wide beamwidth. There is a linear array of, e.g., 16 antennas (e.g. whip antennas), each with its own receiver/digitizer system to sample the complex signal. The separation of the antennas is slightly less than $\lambda/2$. This arrangement allows the beams to be steered in software, by adding the appropriate phase differences to the signal from each antenna and summing the signals to produce a narrow beam. The two antenna groups used for the correlation analysis is variable, for example with 16 antennas, we could use two groups of 8 separated by 8 antennas or overlap the arrays, e.g. two groups of 10 separated by 6 if we desire to increase the absolute values of correlation. The summing and phasing of the signals is done in software, either before or after the signal time series of each receiver is Fourier transformed. The correlation functions can be calculated using two successive complex Fourier transforms. The current vectors can be measured as a function of range and angle from the radar site, thus generating the current map. This analysis can be performed in real time and the data stored on disk, magnetic tape or transferred via phone or satellite links to the user.

The novel features that are considered characteristic of this invention are set forth with particularity in the appended claims. The invention will best be understood from the following description when read in connection with the accompanying drawings.

DETAILED DESCRIPTION OF THE INVENTION

Before discussing the detailed description of one embodiment of the present invention according to the accompanying Figures of the drawings, the theory of the present invention will be explained in detail hereinafter.

The electric field back-scattered from the sea surface is characterized by two dominant spectral components, the so-called first order Bragg lines, corresponding to advancing and receding ocean waves. These components are shifted from the carrier frequency by the Bragg frequency $\pm\omega_B$ ($\omega_B = \sqrt{2\ kg}$, where k is the radar wave number and g is the acceleration due to gravity). These two peaks are in turn Doppler shifted by the line of sight component of the ocean current allowing the measurement of the line of sight current. The transverse correlation length of the field backscattered from a remote volume of homogeneous turbulence is roughly the transverse dimension of the transmitter antenna. Theoretical studies for the case of backscatter from a random sea surface yielded a similar result. By reciprocity therefore, the linear receiving antennas will see a field correlation length about the length L of the receiving antenna. The backscattered field will be translated across the receiving antenna at a velocity 2v, where v is the transverse current velocity in the scattering area, so that the cross-correlation function of the signal detected by two antennas separated by a distance $D_{12}$ will have a peak at a time lag $D_{12}/2v$ if the field is not changing. In practice the field evolves as it moves so that the peak appears at a lag smaller than $D_{12}/2v$ and must be corrected using the information from the auto-correlation function.

If the receiving antennas have Gaussian radiation patterns, the fields are unchanging (i.e., they are being translated, but are not evolving), and the flow is uniform within the radar resolution area, then the temporal cross-correlation function of the field detected at two antennas $\rho_{12}$ is given by (1):

$$|\rho_{12}(\tau)| \alpha \sqrt{1 + 2A\cos(2\omega_B\tau) + A^2} \exp[-4(v\tau - D_{12}\cos\theta/2)^2/(L\cos\theta)^2]$$

where A is the spectral power of the Bragg line associated with the wave propagating towards the antenna divided by the power of the Bragg line for the receding wave, and is the angle from the boresight of the antenna array. Note that if the separation $D_{12}$ is zero, (1) corresponds to the auto-correlation function. The Gaussian envelope is the Fourier transform of the Doppler spectral line shape assumed in the theoretical development to be Gaussian (the actual analysis makes no assumption on the line shape). The oscillatory term arises because of the two spectral peaks. The magnitude of the oscillations of $\rho_{12}$ is directly related to the relative magnitudes of the two spectral peaks, i.e., if the two peaks have equal magnitude (A=1) the oscillations will have 100% amplitude modulation under the correlation function envelope.

Figure 2:
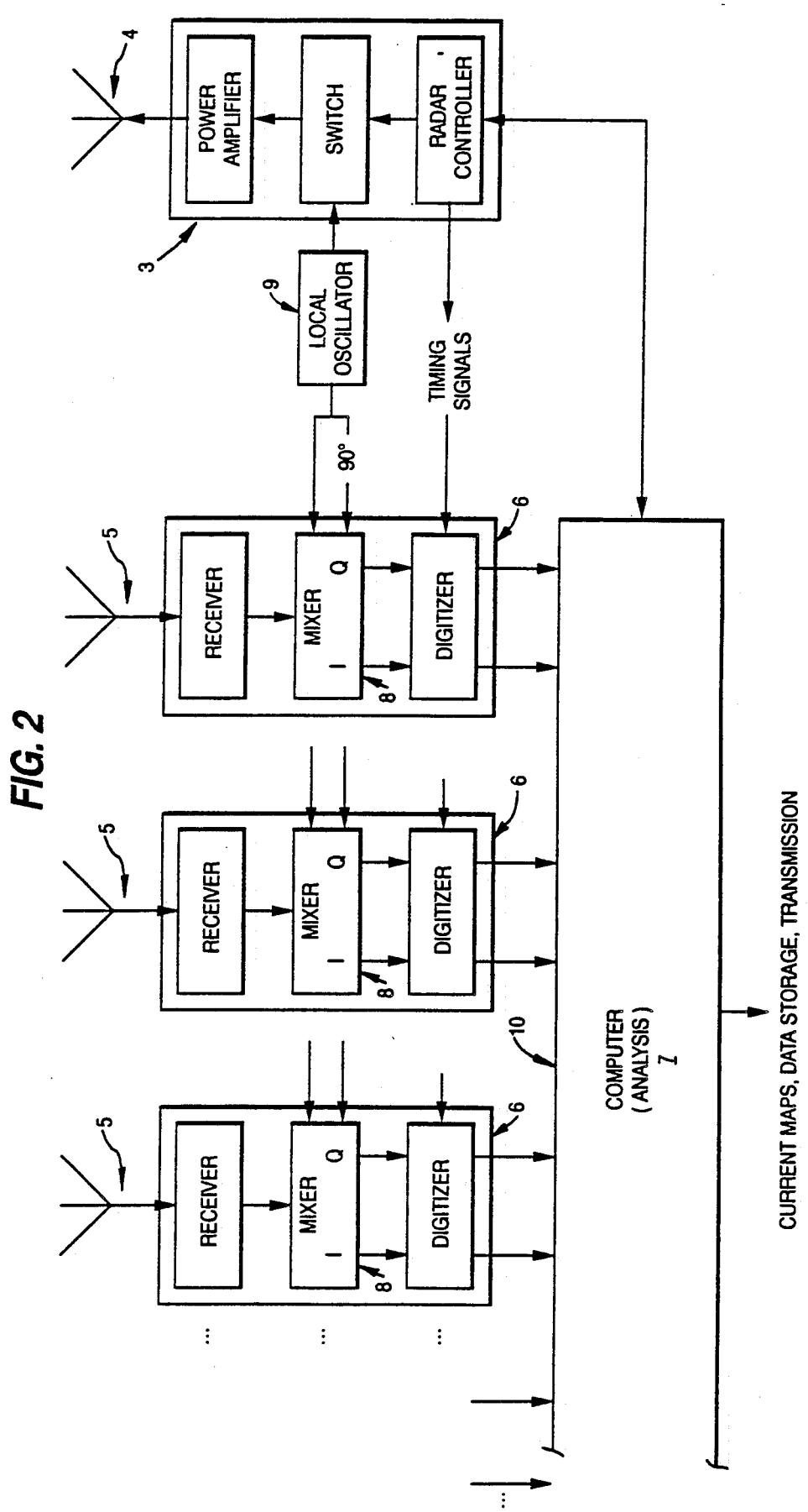
FIG. 2 is a schematic block diagram of a current mapping radar unit of the instant invention.
Figure 3:
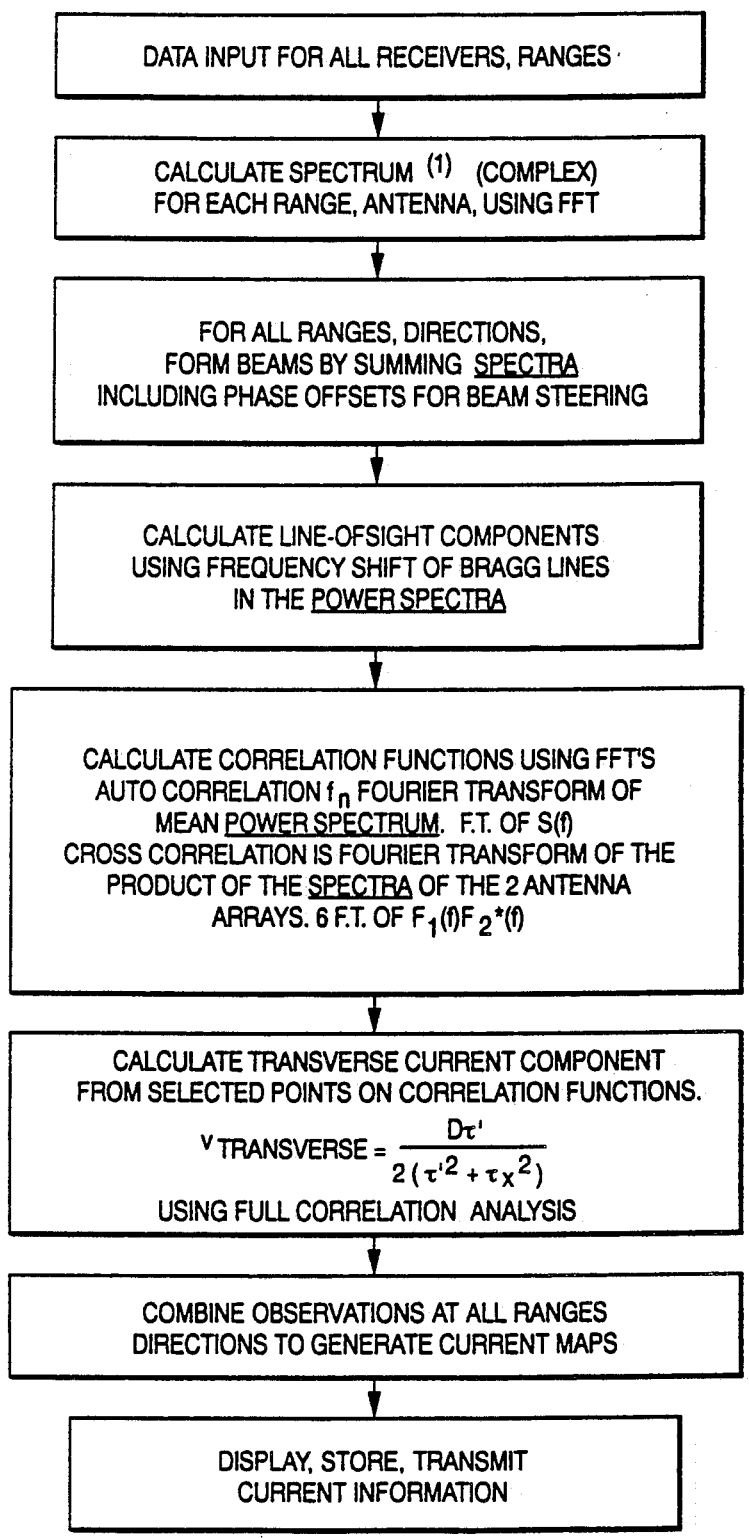
FIG. 3 is a flow chart of the processing steps in producing the current vector map.

If the surface wave components evolve causing the backscattered field to change significantly as it moves past the receivers, or if the flow is changing in time, the maximum value of the cross-correlation function is decreased and the position of the maximum correlation is biased towards zero lag, although the basic form of (1) remains. Thus an estimate based on (1) over-estimates the current. A one dimensional variation of the full correlation analysis (FCA) can correct for the random changes using information about the auto-correlation function as well as the cross-correlation function. Thus, we need another measurement. We use the value of lag such that the auto-correlation function falls to the maximum value of cross-correlation $\tau_x$ although other combinations are possible, in addition to the position of the maximum of the cross-correlation function $\tau'$ (FIG. 2). The velocity estimate using these parameters is given by (2):

$$v = \frac{D_{12}\tau'}{2(\tau'^2 + \tau_x^2)}$$

We can consider two extreme cases. First, if the random changes of the field are negligible this reduces to the same estimate as (1), since $\tau_x$ will be equal to zero because the cross-correlation peak would be equal to unity. Second, if there is zero drift velocity, then the cross-correlation function will have a peak at zero lag ($\tau'=0$), corresponding to the spatial correlation and values of cross-correlation will decrease with increasing values of lag. Therefore the FCA returns a zero velocity, while the simple approach would give an infinite drift velocity.

The uncertainty in a correlation coefficient is approximately equal to $(1-\rho^2)/\sqrt{N}$, where N is the number of independent points in the time series and $\rho$ is the value of correlation. N is approximately equal to $T/\tau_{0.5}$ where T is the record length and $\tau_{0.5}$ is the lag such that the auto-correlation function falls to a value of 0.5. Thus, if the maximum cross-correlation coefficient has a value comparable to $1/\sqrt{N}$, it is not statistically different from $\tau=0$ and no velocity estimate is made. The relations for the uncertainty in $\tau$ and $\tau_x$ may be used to calculate uncertainties in the velocity estimates.

DESCRIPTION OF PREFERRED EMBODIMENT

Figure 1A:
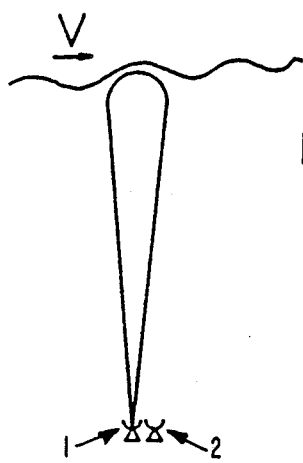
FIG. 1 is a schematic showing the spaced antenna system for measuring surface ocean currents illustrating the backscattered electric field moving past a pair of antennas.
Figure 1B:
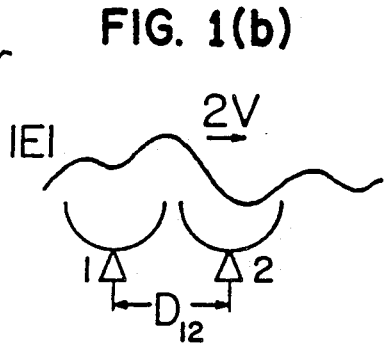
Figure 1C:
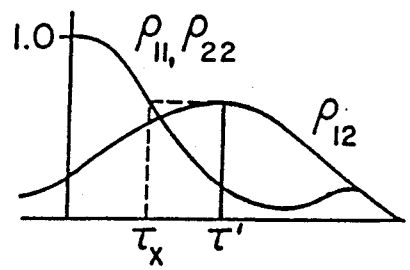

Referring to FIG. 1, there is shown, a schematic for measuring surface ocean currents illustrating the backscattered electric field moving past a pair of antennas 1 and 2 in a single station ocean current mapper showing the field of irregularities moving (a), the resulting pattern of electric field strength (b), and the resulting auto-correlation functions ($\tau_{11}$ and $\tau_{22}$) and cross-correlation function ($\tau_{12}$) (c). The correlation functions of the detected signal are calculated and the parameters $\rho'$ and $\tau_x$ are measured, from which the transverse current can be determined.

Referring to FIG. 2, there is shown a schematic block diagram of a current mapping radar unit as would be utilized in the instant invention. The radar 3 is a pulsed monostatic radar operating in the HF/VHF range. It has a single transmitting antenna 4 (e.g. Yagi) with a wide beamwidth. There is a linear array of receiving antennas 5 (e.g. whip antennas), each with its own receiver/digitizer system 6 to sample the complex signal. The separation of the antennas is slightly less than $\lambda/2$. This arrangement allows the beams to be steered in software processed in computer 7, by adding the appropriate phase differences to the signal from each antenna and summing the signals.

Figure 4:
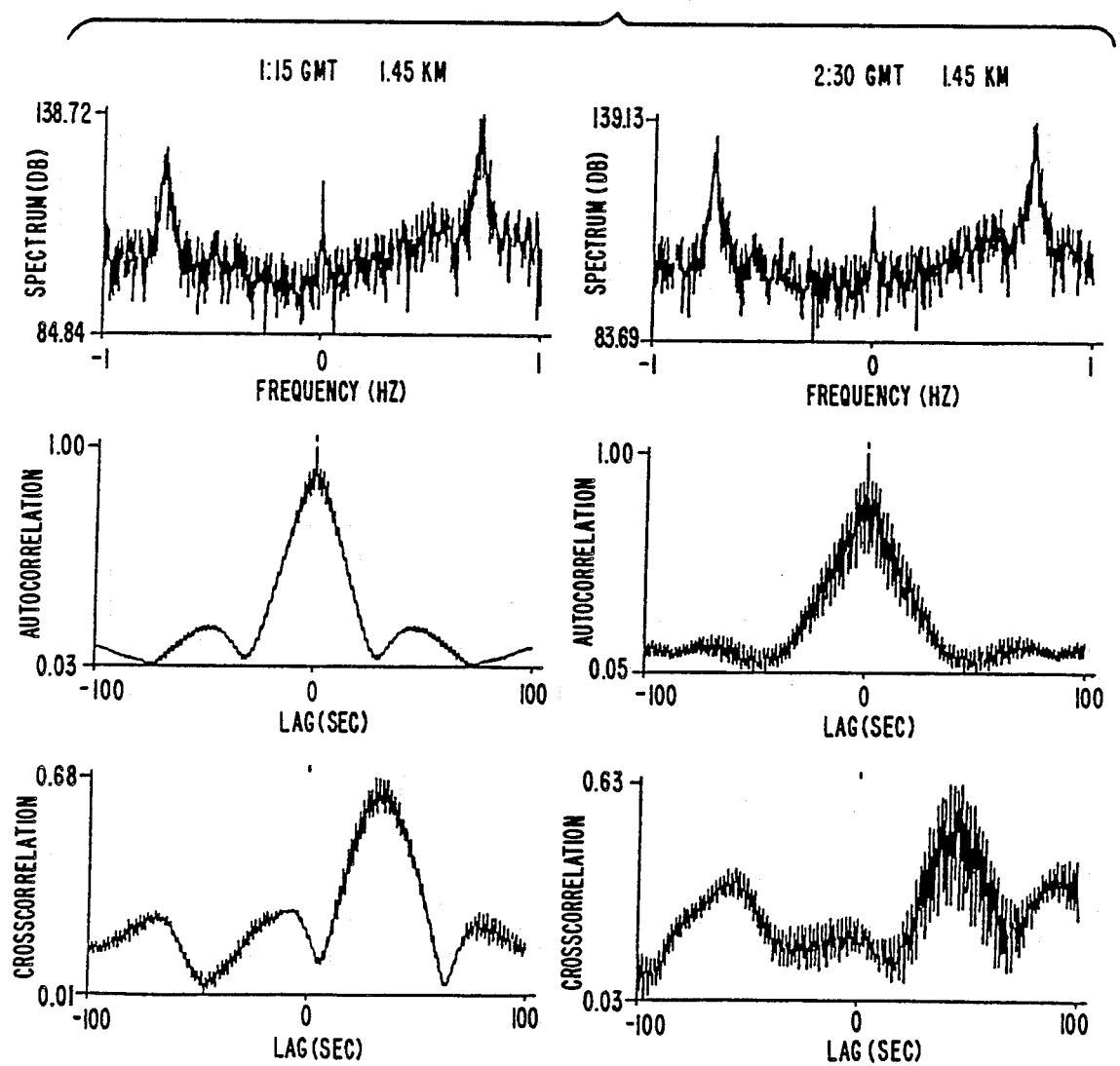
FIG. 4 illustrates samples of the mean spectrum and auto-correlation functions together with the cross-correlation function at a range of 1.45 km.

The two antenna groups used for the correlation analysis is variable, for example with 16 antennas, we could use two groups of 8 separated by 8 antennas or overlap the arrays, e.g., two groups of 10 separated by 6 if we desire to increase the absolute values of correlation. The summing and phasing of the signals is done in software as shown in FIG. 4, either before or after the time series of each receiver is Fourier transformed.

The mixers 8 form an IF signal by mixing the received RF signal with a local oscillator signal generated by local oscillator 9. Two IF channels are employed: an "In phase" channel (I) and a "Quadrature" channel (Q). The signals thru these channels are balanced to have the same amplitude but are 90° out of phase with each other. This is one of two conventional methods employed when Fast Fourier Transformation (FFT) of the signal is ultimately to be performed. It allows the signal to be mixed to baseband (zero IF) before digitization, after which the signals from each channel form the real and imaginary arrays of the Fourier transform input. The receivers/digitizers 6 are connected sequentially and computer input/output bus 10 serves as the transfer point between digital hardware components for processing all digital data.

In a test of the concept of the invention the radar was located on the top of a cliff overlooking the Santa Barbara channel (California). The operating frequency was 49.8 MHz ($\lambda=6m$). This radar was a modified wind profiling radar formerly used in the Colorado network, except for the antennas and a second receiver channel. The horizontally directed receiving antenna consisted of a linear array of 15 whip antennas with a spacing of $\lambda/2$. The transmitting antenna was a five element Yagi directed parallel with the boresight of the receiving array. The antennas looked directly out over the channel and no beam steering was performed. The receiving array was separated into two groups of seven antennas separated by $3.5\lambda$. The 3 db beam width of the seven-element arrays was 16°. The data acquisition was identical to that used for the wind profiler application except that the time domain integration of the signal was done over a period of 0.3 sec to prevent signal aliasing. Time series consisting of 512 points were collected on disc and transferred to magnetic tape. There were six range gates sampled at 300 m intervals for ranges between about 1000 and 3000 m. With shorter time series, more range cells could have been monitored. The small number of range gates was determined by limited memory on an old computer and the necessity for time series of several min. duration. A new microcomputer based data system would allow an order of magnitude more range gates to be sampled and beam steering could be performed by adding and phase shifting the voltage samples from individual elements of the array after data acquisition.

The experiment was performed during November 1988. Examples of the spectra and correlation functions are shown in FIG. 4. The line of sight velocity $\mu$ was determined from the spectral offset of the first order Bragg lines and the transverse current component was determined from the correlation functions using (2). The velocity measurements were reasonable with what is expected in this channel, but no in-situ measurements were available. The transverse current was slightly higher in the first observation and the position of the peak of the cross-correlation function was closer to the origin. The auto-correlation function was also correspondingly narrower. Features to note in FIG. 4 are the correspondence between the relative amplitudes of the spectral peaks and the corresponding depth of the "ripple" in the correlation functions. The peak values of the cross-correlation functions were about 0.5, which indicates that the backscattered pattern of field strength incident on the antennas was rapidly evolving as it was displaced. The necessity for using the full correlation analysis, or an equivalent, is therefore demonstrated.

The uncertainty in the transverse velocity estimate can be estimated using expressions for the uncertainty of $\tau'$ and $\tau_x^2$ and the associated velocity uncertainty is typically about 5 cm s$^{-1}$ for these data. Some improvement would be obtained if the peak values of the cross-correlation could be increased, for example, by using smaller separations by overlapping the receiving antenna arrays.

The flow in the Santa Barbara channel is known to be complex and highly variable with time so that fluctuations in the observed currents may be real. A more complete verification of the spaced antenna technique applied to measuring transverse ocean currents awaits observation at a location with a fairly uniform, well known structure and where in situ measurements can provide verification.

Thus it has been shown that the spaced antenna technique has considerable promise for ocean current mapping applications, eliminating the need for a second radar site to map the full ocean current vector and reducing ambiguities in complex flow. The use of a single radar to measure the full current vector will also allow these radars to be used in locations that are not accessible to a dual radar system and potentially provide increased area coverage. Some improvement may be possible by using partially overlapping receiving arrays (or the signal from some antennas twice) to increase the value of the peak cross-correlation coefficients. A full ocean current mapping system could consist of a single radar with multiple antenna elements and separate receivers for each antenna element. This allows beam steering by introducing phase differences in the received signal form each element and summing the signal. The line of sight Doppler shift would be calculated using the full antenna array and the spaced antenna technique could be applied to two or more groups of antennas in the array. The transverse component is measured over a wider angle since the angular resolution is decreased compared to the radial Doppler measurements unless the same groups were used to independently measure the line of sight current component.

Although particular embodiments of the invention have been described and illustrated herein, numerous modifications and variations of the present invention are possible in light of the above teachings. It is therefore to be understood that within the scope of the appended claims, the invention may be practiced otherwise than specifically described herein.

What is claimed is:

1. A method for measurement of ocean currents using a single radar scanning the ocean surface with a directional beam and using spatially separated antenna arrays, comprising the steps of calculating the spectrum for each range and antenna,
    forming beams by summing spectra including phase offsets for beam steering,
    calculating radial velocity using the spectral offset of the first order Bragg lines,
    calculating correlation functions using fast Fourier transforms of mean power spectrum and cross-spectrum,
    calculating transverse current components from parameters $\tau'$ and $\tau_x$ on correlation functions, where T' is the position of the maximum of the cross-correlation function, and $T_x$ is the lag such that the auto-correlation function falls to the maximum value of cross-correlation, and
    combining the observations of the radial and transverse current components at all ranges and directions to generate current maps.

2. The method recited in claim 1 wherein the transverse component $\gamma$ is determined from the correlation functions using $$v = \frac{D_{12}\tau'}{2(\tau'^2 + \tau_x^2)}$$

where:

$D_{12}$ is the distance between receiving antennas.

3. Apparatus for mapping ocean current velocity vectors comprising,
   a pulsed monostatic radar having a single transmitting antenna which transmits directional RF signals at the ocean surface,
   a linear array of receiving antennas each having receiver means for detecting RF signals reflected off waves on said ocean surface,
   means for generating and mixing a local oscillator signal with said detected RF signals to form a digitized Fourier transform input signal,
   means for Fourier transforming said input signal obtained from said generating and mixing means,
   squaring the resulting spectra from adjacent antennas to form beams including phase shifts to steer said beams,
   squaring the resulting spectra to give the power spectrum,
   measuring the radial current components,
   multiplying the spectra from adjacent arrays to form the cross-spectrum,
   Fourier transforming the cross-spectrum to give the cross-correlation function of the signals detected at the antenna arrays,
   Fourier transforming the power spectrum to give the auto-correlation function, and
   estimating the transverse current component, and
   output means adapted to display, store, and transmit current information.

* * * * *